No. 689,676. Patented Dec. 24, 1901.
F. KNÖBEL.
BOX FOR VEHICLES.
(Application filed July 12, 1901.)
(No Model.)
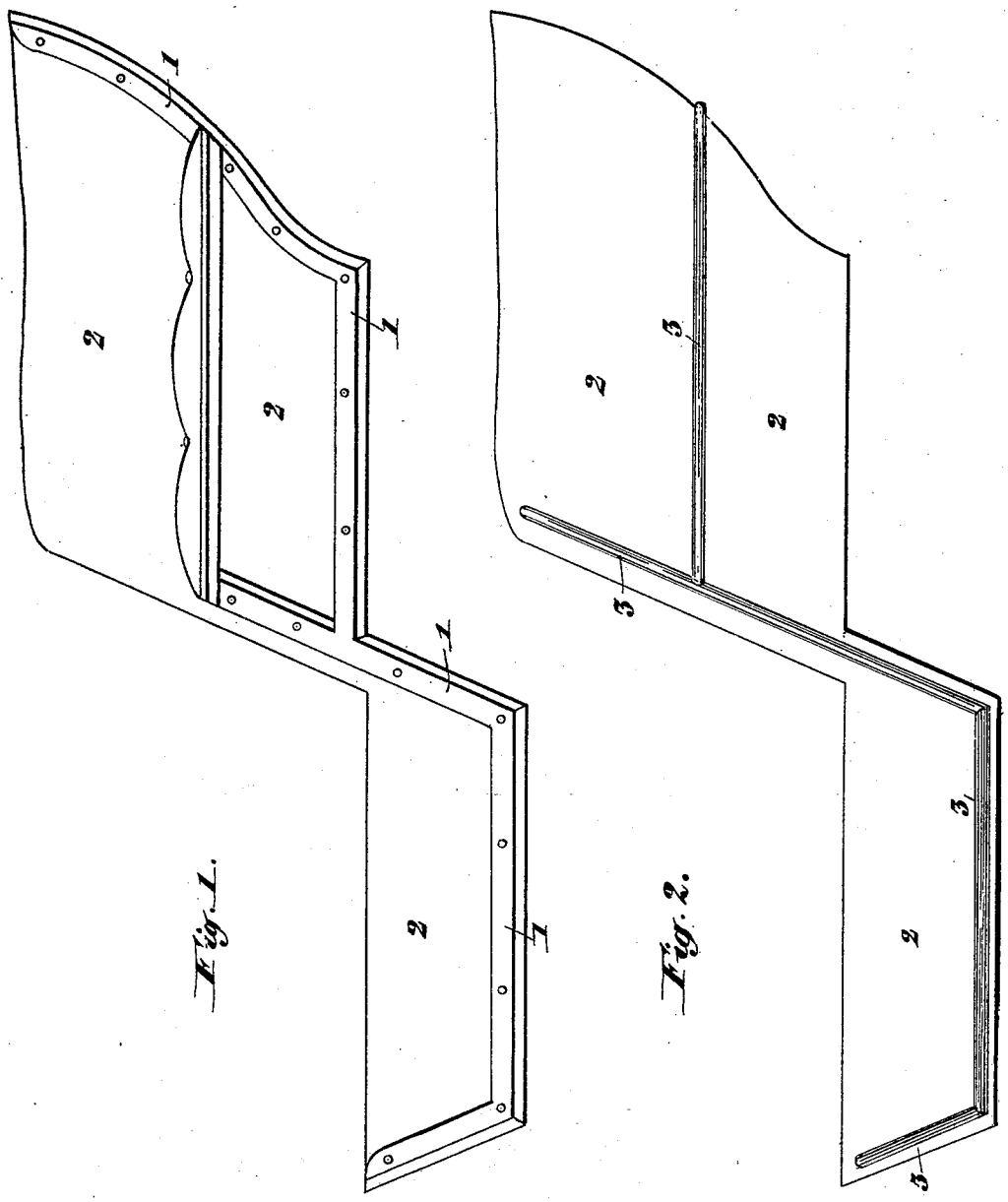

UNITED STATES PATENT OFFICE.

FRANZ KNÖBEL, OF WIEDENBRUCK, GERMANY.

BOX FOR VEHICLES.

SPECIFICATION forming part of Letters Patent No. 689,676, dated December 24, 1901.

Application filed July 12, 1901. Serial No. 67,940. (No model.)

*To all whom it may concern:*

Be it known that I, FRANZ KNÖBEL, a subject of the Emperor of Germany, and a resident of Wiedenbruck, Germany, have invented certain new and useful Improvements in Boxes for Vehicles, of which the following is a specification.

This invention relates to boxes for vehicles, the frame of which is made of angle metal, the fittings being fixed by means of a hollow rod having a semicircular section and which can be fastened at the same time as the wood to the metal frame by any suitable means. The seat is also made of angle metal and can be folded or detached from the box.

In the accompanying drawings, Figure 1 is a view of the inside of the box. Fig. 2 is a view of the box from the outside.

In the drawings the reference-numeral 1 represents the angle-irons composing the frame. To the exterior of these angle-irons are secured, by means of screws, rivets, or other means, the wooden fittings 2, forming the body of the vehicle. To the exterior of the wooden fittings and in alinement with the angle-irons are secured hollow metal rods, semicircular in cross-section. The same means is employed for securing the hollow metal rods to the exterior of the wooden fittings as is employed for securing the angle-irons to the wooden fittings. Angle-irons of a rectangular shape are preferably used.

Having fully described my invention, what I desire to secure by Letters Patent is—

In a device of the character described, a frame composed of integral angle-irons, wooden fittings secured to the exterior of said angle-irons, hollow metal rods semicircular in cross-section secured to the said wooden fittings on the other side thereof and in alinement with said angle-irons, the said hollow metal rods having their rounded surfaces exposed, and screws fastening said metal rods to the angle-irons, said screws passing through said wooden fittings, substantially as described.

In testimony whereof I have hereunto set my hand in presence of two witnesses.

FRANZ KNÖBEL.

Witnesses:
WM. ESSENWEIN,
PETER LIEBER.